US007484427B2

(12) United States Patent
Kolkind

(10) Patent No.: US 7,484,427 B2
(45) Date of Patent: Feb. 3, 2009

(54) ADJUSTABLE TORQUE THREAD GAUGE ASSEMBLY AND METHOD OF CALIBRATION THEREOF

(75) Inventor: Andrew Kolkind, Dalbo, MN (US)

(73) Assignee: Bolt Bethel, LLC, Medway, MA (US)

( * ) Notice: Subject to any disclaimer, the term of this patent is extended or adjusted under 35 U.S.C. 154(b) by 369 days.

(21) Appl. No.: 11/447,675

(22) Filed: Jun. 6, 2006

(65) Prior Publication Data
US 2007/0283788 A1    Dec. 13, 2007

(51) Int. Cl.
*G01D 1/00*    (2006.01)
(52) U.S. Cl. .................. 73/862.23; 73/761; 73/862.21; 73/862.22; 73/862.321; 81/52
(58) Field of Classification Search ............. 73/761, 73/862.21, 862.22, 862.23, 862.321; 81/52
See application file for complete search history.

(56) References Cited

U.S. PATENT DOCUMENTS

| | | | | | |
|---|---|---|---|---|---|
| 2,861,347 | A | * | 11/1958 | Von Tarnik | ............... 33/501.45 |
| 3,015,892 | A | * | 1/1962 | Stuart | ........................... 33/542 |
| 3,429,179 | A | * | 2/1969 | Fischer et al. | .......... 73/862.041 |
| 4,299,519 | A | * | 11/1981 | Corbett | ................... 29/243.522 |
| 4,519,144 | A | * | 5/1985 | Larsen | ...................... 33/199 R |
| 4,691,441 | A | * | 9/1987 | Van Horssen | .............. 33/199 R |
| 4,724,618 | A | * | 2/1988 | Van Horssen | .............. 33/199 R |
| 4,858,330 | A | * | 8/1989 | Larsen | ...................... 33/199 R |
| 4,926,700 | A | * | 5/1990 | Peplinski | ................. 73/862.23 |
| 5,898,112 | A | * | 4/1999 | Dawood | ................... 73/862.23 |
| 6,302,409 | B1 | * | 10/2001 | Gutsche | ....................... 279/128 |
| 7,059,055 | B2 | * | 6/2006 | Wickham et al. | .......... 33/199 R |
| 7,162,802 | B2 | * | 1/2007 | Benardeau et al. | ............ 30/147 |
| 2007/0261868 | A1 | * | 11/2007 | Gross | ............................ 173/2 |

* cited by examiner

*Primary Examiner*—Edward Lefkowitz
*Assistant Examiner*—Freddie Kirkland, III
(74) *Attorney, Agent, or Firm*—Niro, Scavone, Haller & Niro

(57) ABSTRACT

The apparatus of the present invention comprises a tool having a threaded member which is characterized by a cylindrical shaft or spindle with a surrounding body or handle. The shaft and body are operably engaged by means of a series of magnets in the spindle and the body, and the operable engagement releases once the torque force on the threaded member exceeds the magnetic force between the body and the spindle. In the method of the present invention, the user can calibrate and adjust the torque limit of the assembly by attaching a calibration bar of predetermined length to the threaded member and then rotating the tool over a scale such that the calibration bar contacts the surface of the scale. The user can then adjust a set screw which alters the length of the shaft and alters the magnetic force between the body and the spindle and correspondingly alters the torque limit of the tool to a desired level.

5 Claims, 2 Drawing Sheets

ADJUSTABLE TORQUE THREAD GAUGE ASSEMBLY AND METHOD OF CALIBRATION THEREOF

FIELD OF INVENTION

The present invention relates to an assembly including a tool having a threaded member which is characterized by a cylindrical shaft or spindle with a surrounding body or handle. More specifically, the spindle and body are engaged by means of a series of magnets in the spindle and the body, whereby the operable engagement releases once the torque force on the threaded member exceeds the magnetic force between the body and the spindle. A preferred embodiment of practicing this invention further includes a method of calibrating and adjusting the torque limit of the assembly, first by attaching a calibration bar of predetermined length to the threaded member and then rotating the tool over a scale such that the calibration bar contacts the surface of the scale, and then by adjusting the length of the shaft to alter the level of magnetic force of the shaft and body magnets to a desired level.

BACKGROUND OF THE INVENTION

There are a variety of applications, from medical environments to heavy industrial applications, which require the creation and use of threaded holes or openings for subsequent use with screws, bolts and the like. In practice, it is vital to have a system for testing such holes to ensure that they have been properly made, particularly in environments where the creation and use of such openings (and the consequences of an improperly sized opening) demand the highest level of accuracy.

With such requirements, it may be necessary to check each such hole in order to gauge the size of the openings. An inspector must use tools to check the size of openings to ensure that they meet the necessary requirements (i.e., that they are not too big or too small). In most applications, this may involve different inspectors, each using their own skill and judgment. Furthermore, within a given field of use, there may be different torque limitations for different openings depending, for instance, upon the size of the opening, the material forming the opening and other factors.

By using a thread gage tool with a preselected, adjustable and measurable torque level, different inspectors can provide a uniform, objective quality control process for testing openings. Thus, it can be seen that there is a need for an apparatus to provide an adjustable torque gauge assembly for a variety of applications.

OBJECTS OF THE INVENTION

One object of the disclosed invention is to provide a torque thread gauge assembly which provides a clear and relatively uniform measurement for threaded openings to determine whether they have the desired level of torque.

Yet another object of the present invention is to provide an adjustable torque thread gauge assembly to provide a measurable and adjustable torque thread gauge tool to tailor torque measurement of holes based upon the requirements of the application.

Still another object of the present invention is to provide a tool having a threaded member and a torque limited handle such that the handle disengages from driving the threaded member when the torque acting on the threaded member exceeds a preselected limit.

It should be noted that not every embodiment of the claimed invention will accomplish each of the objects of the invention set forth above. In addition, further objects of the invention will become apparent based the summary of the invention, the detailed description of preferred embodiments, and as illustrated in the accompanying drawings.

DESCRIPTION OF THE PRIOR ART

A typical example of the prior art is shown in the so-called go/no-go gauge. The go/no-go gauge consists generally of a threaded plug which is manually inserted into the opening being tested. The go gauge is inserted into the hole to be tested, and if it enters into the opening without the inspector having to apply an undue amount of torque, the inspector would know that the hole meets specifications. On the other hand, if the inspector had to apply undue torque or could not get the threaded plug into the opening, the inspector would then know to reject the opening as flawed. Conversely, the no-go gauge is inserted into the hole being testing, and if it fails to enter into the opening through the use of a proper amount of torque, the inspector would know that the hole meets specifications.

Of course, this approach has serious limitations. Different inspectors will use different judgment and apply differing amounts of manual torque in testing the opening. Other prior art approaches (such as U.S. Pat. No. 4,926,700, to Peplinski) require complex electrical and mechanical assemblies including electronic sensors and monitoring to ensure the appropriate level of torque is being applied. Such prior art is unduly expensive, requires extra operator training and skill, and involves a bulk and complexity that may limit the use of such gauges to certain operating environments.

In addition, the use of softer plastic materials in modern applications for various openings makes it difficult for inspectors to consistently and accurately judge manual torque levels for such openings.

None of the prior art discloses (among other elements) a simple mechanical tool having a manual handle with an adjustable torque limitation for consistently gauging the torque levels of various openings.

DEFINITION OF TERMS

The following terms are used in the claims of the patent as filed and are intended to have their broadest plain and ordinary meaning consistent with the requirements of the law.

"Threaded Member": this includes a pitch stud, a thread plug, or a screw or bolt thread or the like. The threaded member can be threaded into one end of the shaft, or in an alternative embodiment can be integrally molded with the shaft. In another alternative embodiment, the threaded member can include a female thread within the shaft or spindle which received and tests male threaded members (e.g., screws or bolts) to ensure they are of the proper dimensions.

Where alternative meanings are possible, the broadest meaning is intended. All words used in the claims set forth below are intended to be used in the normal, customary usage of grammar and the English language.

SUMMARY OF INVENTION

The apparatus of the present invention generally includes a tool made up of a cylindrical shaft, with a first end and a second end, said shaft further having a threaded member projecting from said first end. It should be understood that the tool will typically be part of a set, i.e., a "go" tool and a "no-go" tool. An alternative version of the present invention comprises a shaft defining an opening to receive a threaded member projecting into the first end. Another form of the present invention further includes the shaft having a number of magnets spaced around the circumference of the shaft at a given axial point of the shaft. Surrounding the shaft is a body which substantially surrounds the circumference of the shaft and is coaxial with the shaft, the body including an interior portion, and an outside gripping portion. The body further has a second plurality of magnets spaced around the circumference of the interior cylindrical opening at a given axial point of the body.

In operation, the body and the shaft are magnetically engaged to one another by the magnets in the shaft and the counterpart magnets in the body such that rotation of said gripping portion of the body provides a rotational force to drive the threaded member. When the threaded member is in operation (e.g., when testing an opening) the shaft and body magnets disengage from one another and permit the shaft to rotate within the body when the torque force on the threaded member exceeds a preselected limit.

The selection of the torque limit may be accomplished, among other ways, by the use of a calibration bar of predetermined length (e.g., 1 inch) which has a threaded opening for connecting to the threaded member. The user can then calibrate the tool by holding the tool parallel to the surface of a scale, and then rotating the gripping portion of the body until the calibration bar contacts the surface of the scale. The weight measured by the scale at the point at which the body and shaft magnets disengage provides a measure of the torque limit of the tool. The torque limit of the tool may be adjusted in one version of the present invention by adjusting the length of the shaft (and thus the magnetic strength between the shaft and body magnets). Such adjustment can be enabled by the use of a set, screw, pitch stud or similar structure which can extend from or retract into a threaded opening at the end of the shaft opposite the threaded member. The user may then alter and recalibrate the torque limit of the tool to a desired level. Thus, a tool having an adjustable torque limit and a method of calibrating and adjusting such a tool is disclosed.

These and other objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
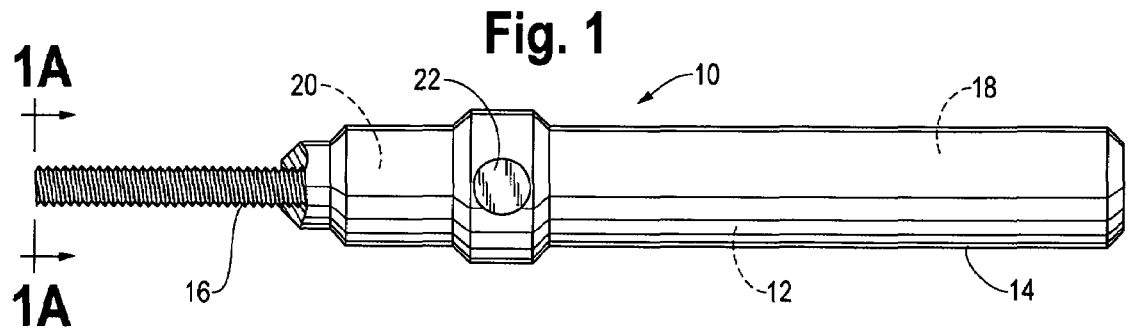
FIG. 1 shows an exposed side view of a preferred embodiment of the assembly, including the shaft, body, threaded member and adjustable set screw components.
Figure 1A:
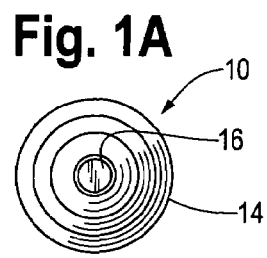

FIG. 1 shows a first preferred embodiment of assembly 10 of the present invention, comprising a shaft or spindle 12, a body 14, a threaded member 16, and a set screw 18. When a user grips and rotates the outside of the body 14 in a radial direction, that rotational force turns the shaft 12 in a similar rotational direction by the magnetic force between a first set of magnets 20 located in the shaft 12 and a second set of magnets located in the body 14.

Figure 2A:
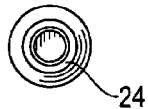
FIG. 2 an exposed side view of a preferred embodiment of the shaft component.
Figure 2:
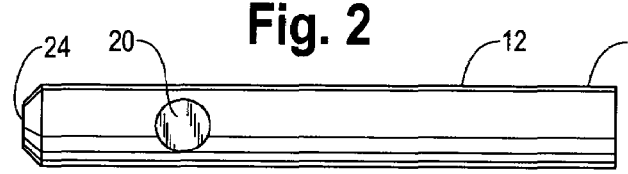
Figure 2B:
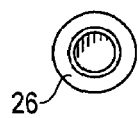

Shaft 12 is most preferably stainless steel, although other materials (e.g., brass) which are non-magnetic or have limited magnetism may also be preferred. As shown in FIG. 2, shaft 12 is preferably cylindrical, and has a first end 24 which defines an opening for receiving the threaded member 16. Shaft 12 further preferably has set of magnets 20 displaced around the circumference of the shaft 12 at a given axial point. Most preferably, the set of magnets 20 comprises a group of three magnets, each spaced approximately 120 degrees apart from one another around the circumference of the shaft. The shaft further has a second end 26 which preferably defines a threaded opening for receiving an adjustable set screw 18. In an alternative embodiment (not shown), the threaded member 16 may be integral to and extending from the first end 24. In another alternative embodiment, the first end 24 may be used to receive the threaded members of bolts, screws and the like to test their diameters based upon the torque limit of the assembly 10. In yet a further alternative embodiment of the present invention (also not shown), the second end 26 may lack an opening for receiving a set screw. Such an alternative could be used where the assembly uses a preselected, fixed torque limit (i.e., axial placement of shaft 12 vis a vis body 14 remains fixed) or where the body 14 includes a structure for adjusting the axial relationship of the shaft 12 and the body 14. Those of ordinary skill in the art will understand from the above disclosure and drawing how such alternatives may be practiced within the scope of the present invention.

Figure 3A:
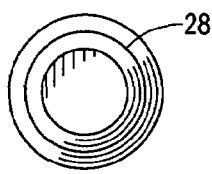
FIG. 3 an exposed side view of a preferred embodiment of the body component.
Figure 3:
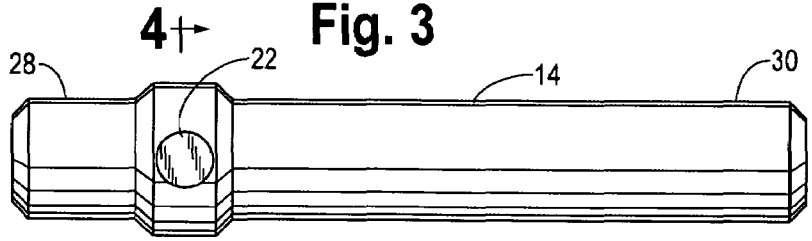

The body 14 is most preferably aluminum although, although other materials (e.g., stainless steel) which are non-magnetic or have limited magnetism may also be preferred. As shown in FIGS. 1 and 3, body 14 is preferably cylindrical, and has a first end 28 which defines an opening having sufficient interior diameter for receiving the shaft 12. The body 14 further has a closed second end 30 for contacting the set screw 18 or in the case of the alternative, fixed torque limit embodiment discussed above, the second end 30 will contact the second end 26 of shaft 12. The body 14 also includes a second set of magnets 22 which are located around the interior diameter of the body 14 at a given axial point. This second set of magnets 22 most preferably includes three magnets which are spaced approximately 120 degrees apart from one another around the interior diameter of the body.

Figure 4:
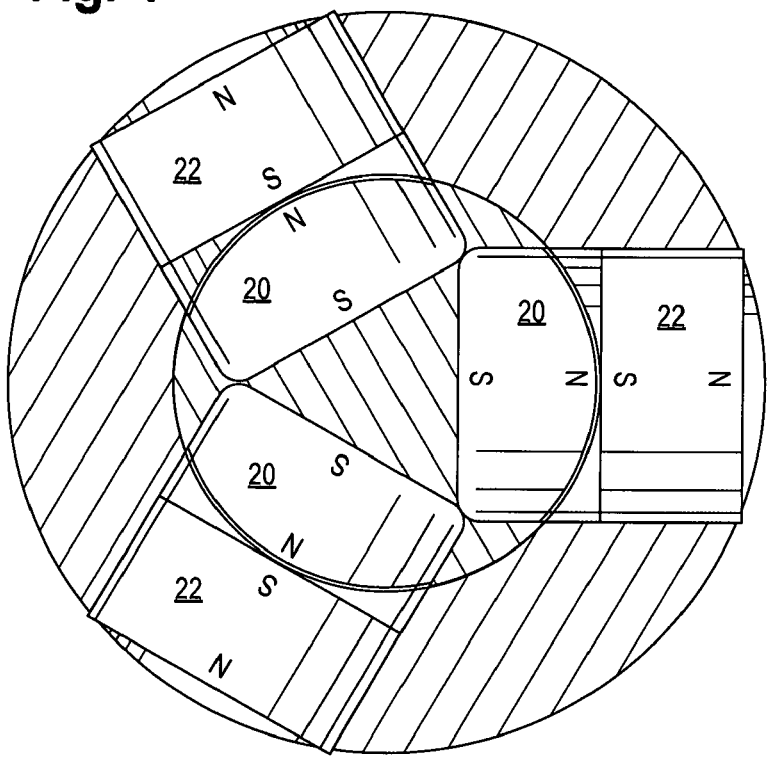
FIG. 4 is an exposed front view of the assembly showing the engagement of the body and shaft magnets in a preferred embodiment.

As shown in FIG. 4, the opposite poles of the first set of magnets 20 in the shaft 12 and the second set of magnets 22 in the body 14 are closest to one another such that when a user grips the outside surface of the body 14 and rotates it, the magnetic attraction between the sets of magnets 20 and 22 will cause the shaft 12 to rotate, which in turn drives the threaded member 16. If, however, the resistance on the threaded member 16 during operation (e.g., from trying to enter into a threaded opening that is too small for a go-gauge) exceeds the magnetic torque force between the sets of magnets 20 and 22, the body 14 will continue to rotate and in effect uncouple from the shaft 12, causing the operator to feel a snapping action in which the body 14 rotationally displaces relative to the shaft approximately 120 degrees until the next magnetic contact points between the sets of magnets 20 and 22. When this event occurs, the user of the assembly 10 knows that the hole or aperture being acted upon by the threaded member is too small in the case of a go-gauge. In the case of a no-go gauge, the user would want the assembly 10 to so displace or ratchet in order to ensure that the hole or aperture was not too large.

Figure 5:
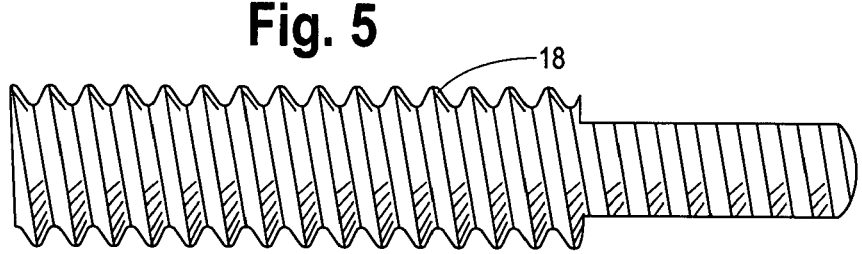
FIG. 5 is a side view of the adjustable set screw component of a preferred embodiment of the present invention.
Figure 5A:
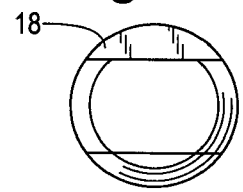
Figure 6A:
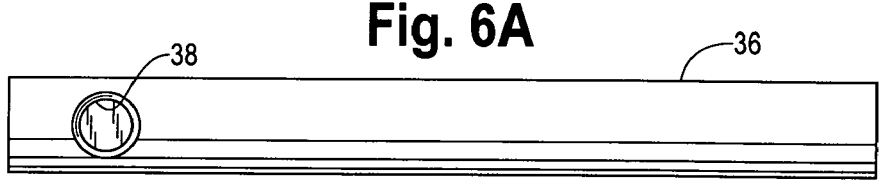
FIGS. 6a and 6b are the side view of a calibration bar used with the assembly in a preferred embodiment of the present invention.
Figure 6B:
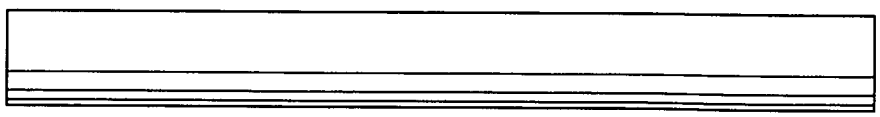

Of course, it may be desirable to use a different torque limit depending upon the application involved. Likewise, it may be desirable to reproduce the same torque limit between two different assemblies. Thus, a preferred embodiment of the present invention discloses structures and a method to calibrate and adjust the torque limit of assembly 10. As shown in FIGS. 1, 5 and 6, preferred structures for accomplishing these objects include set screw 18 and calibration bar 36, to be used in conjunction with a scale (not shown). The calibration bar 36 has a threaded aperture 38 at one of its ends such that the bar 36 may be attached to the threaded member 16.

The method for calibrating and adjusting the torque limit of the assembly may thus be accomplished by the following steps. Further, the calibration bar 36 is attached via the threaded aperture 38 to the end of thread member 16. The user may then rotate the body 14 (and thus rotate the shaft 12 and the threaded member 16), while holding the calibration bar 36 as parallel to the weighing surface of a scale (not shown) as possible. The user then watches the scale reading while rotating the body 14 slowly to get highest value possible (i.e., until the snapping action between the magnet sets 20 and 22). This highest value is the torque limit of the assembly 10. For example, if the calibration bar 36 has a length of 1 inch, and the highest scale reading achieved is 14 grams, the torque limit of the assembly is thus 14 inch/grams.

In one preferred embodiment of the present invention, the torque limit may be adjusted by rotating the set screw 18 further into or out of the threaded opening at the second end 26 of shaft 12. Such adjustment axially displaces the sets of magnets 20 and 22 relative to one another, thus lowering or raising their magnetic torque force as desired. The assembly 10 in conjunction with the calibration bar 36 and scale as described above may further be reused to measure the new, adjusted torque limit of the assembly 10 to ensure that the altered torque limit meets the users expectations.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the selection of which extension elements use a "male thread" versus a female thread is for illustrative purposes with reference to the example drawings only. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A manual tool for providing a torque limited force on a threaded aperture, said tool comprising;
   a. a shaft, said shaft being substantially cylindrical with a first end and a second end, said shaft further having an opening for a threaded member at said first end, said shaft further having a plurality of magnets spaced around the circumference of the shaft at a given axial point of the shaft;
   b. a body including an interior portion defining a cylindrical opening for receiving said shaft therein, and an outside gripping portion, said body further comprising a second plurality of magnets spaced around the circumference of the interior cylindrical opening at a given axial point of the body;
      wherein the body and the shaft are magnetically engaged to one another by said plurality of magnets and said second plurality of magnets such that rotation of said gripping portion provides a rotational force to a threaded member at said first end of the shaft, and said plurality of magnets and said second plurality of magnets disengage and permit the shaft to rotate within the body when the torque force on the threaded member exceeds a preselected limit.

2. A manual tool for providing a torque limited force on a threaded aperture, said tool comprising;
   a. a shaft, said shaft being substantially cylindrical with a first end and a second end, said shaft further having a threaded member projecting from said first end, and a set screw projecting from said second end, said shaft further having a plurality of magnets spaced around the circumference of the shaft at a given axial point of the shaft;
   b. a body including an interior portion defining a cylindrical opening for receiving said shaft therein, and an outside gripping portion, said body further comprising a second plurality of magnets spaced around the circumference of the interior cylindrical opening at a given axial point of the body;
      wherein the body and the shaft are magnetically engaged to one another by said plurality of magnets and said second plurality of magnets such that rotation of said gripping portion provides a rotational force to said threaded member, said plurality of magnets and said second plurality of magnets disengage and permit the shaft to rotate within the body when the torque force on the threaded member exceeds a preselected torque limit and said set screw may be rotated to alter the magnetic force between said plurality of magnets and said second plurality of magnets so as to alter the preselected torque limit.

3. A manual tool for providing a torque limited force on a threaded aperture, said tool comprising;
   a. a shaft, said shaft being substantially cylindrical with a first end and a second end, said shaft further having a threaded member projecting from said first end, said shaft further having a plurality of magnets spaced around the circumference of the shaft at a given axial point of the shaft;
   b. a body including an interior portion defining a cylindrical opening for receiving said shaft therein, and an outside gripping portion, said body further comprising a second plurality of magnets spaced around the circumference of the interior cylindrical opening at a given axial point of the body;
      wherein the body and the shaft are magnetically engaged to one another by said plurality of magnets and said second plurality of magnets such that rotation of said gripping portion provides a rotational force to said threaded member, and said plurality of magnets and said second plurality of magnets disengage and permit the shaft to rotate within the body when the torque force on the threaded member exceeds a preselected limit.

4. The tool of claim 3, wherein the threaded member is integrally molded with said shaft.

5. A manual tool assembly for providing a torque limited force on a threaded aperture, said assembly comprising;
   a. a shaft, said shaft being substantially cylindrical with a first end and a second end, said shaft further having a threaded member projecting from said first end, and a set screw projecting from said second end, said shaft further having a plurality of magnets spaced around the circumference of the shaft at a given axial point of the shaft;
   b. a body including an interior portion defining a cylindrical opening for receiving said shaft therein, and an outside gripping portion, said body further comprising a second plurality of magnets spaced around the circumference of the interior cylindrical opening at a given axial point of the body; and
   c. a calibration bar for attachment to the threaded member; wherein the body and the shaft are magnetically engaged to one another by said plurality of magnets and said second plurality of magnets such that rotation of said gripping portion provides a rotational force to said threaded member, said plurality of magnets and said second plurality of magnets disengage and permit the shaft to rotate within the body when the torque force on the threaded member exceeds a torque limit, said calibration bar may be attached to said threaded member to measure and calibrate the torque limit, and said set screw may be rotated to alter the magnetic force between said plurality of magnets and said second plurality of magnets so as to alter the torque limit to a desired level.

* * * * *